US008385366B2

(12) United States Patent
Sperschneider et al.

(10) Patent No.: US 8,385,366 B2
(45) Date of Patent: Feb. 26, 2013

(54) APPARATUS AND METHOD FOR TRANSMITTING A SEQUENCE OF DATA PACKETS AND DECODER AND APPARATUS FOR DECODING A SEQUENCE OF DATA PACKETS

(75) Inventors: Ralph Sperschneider, Ebermannstadt (DE); Manfred Lutzky, Nuremberg (DE); Marc Gayer, Erlangen (DE); Markus Lohwasser, Hersbruck (DE); Markus Schnell, Erlangen (DE); Michael Schuldt, München (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 529 days.

(21) Appl. No.: 12/530,647

(22) PCT Filed: Feb. 22, 2008

(86) PCT No.: PCT/EP2008/001420
§ 371 (c)(1),
(2), (4) Date: Mar. 5, 2010

(87) PCT Pub. No.: WO2008/113455
PCT Pub. Date: Sep. 25, 2008

(65) Prior Publication Data
US 2010/0284281 A1 Nov. 11, 2010

Related U.S. Application Data

(60) Provisional application No. 60/912,839, filed on Apr. 19, 2007.

(30) Foreign Application Priority Data

Mar. 20, 2007 (DE) .......................... 10 2007 013 315
Apr. 19, 2007 (DE) .......................... 10 2007 018 484

(51) Int. Cl.
*H04J 3/24* (2006.01)
(52) U.S. Cl. ...................................................... 370/473
(58) Field of Classification Search .................. 370/400, 370/401, 464, 465, 469, 473, 476
See application file for complete search history.

(56) References Cited

U.S. PATENT DOCUMENTS
(Continued)

FOREIGN PATENT DOCUMENTS
EP 0756267 1/1997
EP 1458145 9/2004
(Continued)

OTHER PUBLICATIONS

Russian Decision to Grant, dated Apr. 6, 2011, in related Russian patent application No. 2009134472/09, 8 pages.
(Continued)

*Primary Examiner* — Kerri Rose
(74) *Attorney, Agent, or Firm* — Michael A. Glenn; Glenn Patent Group

(57) ABSTRACT

In the context of packet-oriented data transmission via a network, an apparatus for transmitting a sequence of data packets checks whether a packet is missing or faulty. In this case, a replacement packet is provided which is a valid packet with regard to a packet syntax which, however, has a predetermined contents characteristic. On the decoder side, a basic decoder recognizes the packet as a valid packet and decodes same, whereas an extension decoder can enable an error concealing measure on the basis of an indication in the replacement packet to the fact that this is a replacement packet, in order to provide a higher-quality audio reproduction.

26 Claims, 8 Drawing Sheets

U.S. PATENT DOCUMENTS

| | | |
|---|---|---|
| 5,491,719 A | 2/1996 | Sellin et al. |
| 8,149,330 B2 * | 4/2012 | Streijl .................... 348/468 |
| 2003/0014705 A1 | 1/2003 | Suzuki et al. |
| 2004/0122680 A1 | 6/2004 | McGowan et al. |
| 2005/0058145 A1 * | 3/2005 | Florencio et al. ............ 370/412 |
| 2005/0169245 A1 | 8/2005 | Hindersson |

FOREIGN PATENT DOCUMENTS

| | | |
|---|---|---|
| EP | 1589330 | 10/2005 |
| GB | 2306861 | 7/1997 |
| GB | 2391440 | 2/2004 |
| JP | 2003-218932 | 7/2003 |
| RU | 2120667 C1 | 10/1998 |
| WO | WO95/01682 | 1/1995 |
| WO | WO2006/124852 A2 | 11/2006 |

OTHER PUBLICATIONS

English Translation of Korean office action, dated Mar. 16, 2011, in related Korean patent application No. 10-2009-7019536, 4 pages.
Int'l Preliminary Report on Patentability, English Translation, Oct. 15, 2009, 17 pages.

* cited by examiner (extension decoder)

encoder output base station input ⟶ no. i is too late or faulty (base station output)
(mobile unit input)

(in audio rendering means)

ISO/IEC 14496-3:2005(E)

Table 4.51 – Syntax of extension_payload()

| Syntax | No. of bits | Mnemonic |
|---|---|---|
| extension_payload(cnt) {     extension_type;     align = 4;     switch(extension_type) {         case EXT_DYNAMIC_RANGE:             return dynamic_range_info();         case EXT_SBR_DATA:             return sbr_extension_data(id_aac,0);         case EXT_SBR_DATA_CRC:             return sbr_extension_data(id_aac,1);         case EXT_FILL_DATA:             fill_nibble; /* must be '0000' */ | 4 | uimsbf |
|             for (i=0; i<cnt-1; i++) {                 fill_byte[i]; /* must be '10100101' */             }             return cnt;         case EXT_DATA_ELEMENT:             data_element_version; | 8 | uimsbf |
|  | 4 | uimsbf |
|             switch(data_element_version) {                 case ANC_DATA:                       loopCounter = 0);                       dataElementLength = 0;                       do {                           dataElementLengthPart; | 8 | uimsbf |
|                           dataElementLength += dataElementLengthPart;                           loopCounter++;                   } while (dataElementLengthPart == 255);                 for (i=0; i<dataElementLength; i++) {                       data_element_byte[i]; | 8 | uimsbf |
|                 }                 return (dataElementLength+loopCounter+1);               default:                 align = 0;             }         case EXT_FIL:         default:             for (i=0; i<8*(cnt-1)+align; i++) {                 other_bits[i]; | 1 | uimsbf |
|             }             return cnt;     } } |  |  |

Note 1: id_aac is the id_syn_ele of the corresponding AAC element (ID_SDE or ID_CPE) or ID_SCE in case of CCE.

Note for EXT_SBR_DATA rows: Note1
Note for EXT_SBR_DATA_CRC row: Note1

FIGURE 6A

ISO/IEC 14496-3:2005(E)

Table 4.59 – Syntax of sbr_channel_pair_element()

| Syntax | No. of bits | Mnemonic |
|---|---|---|
| sbr_channel_pair_element(bs_amp_res) { | | |
|   if (bs_data_extra) { | 1 | |
|     bs_reserved | 4 | uimsbf |
|     bs_reserved | 4 | uimsbf |
|   } | | |
|   if (bs_coupling) { | 1 | |
|     bs_grid(0); | | |
|     bs_dtdf(0); | | |
|     bs_dtdf(1); | | |
|     bs_invf(0); | | |
|     sbr_envelope(0,1, bs_amp_res); | | |
|     sbr_noise(0.1); | | |
|     sbr_envelope(1,1, bs_amp_res); | | |
|     sbr_noise(1,1); | | |
|   } else { | | |
|     bs_grid(0); | | |
|     bs_grid(1); | | |
|     bs_dtdf(0); | | |
|     bs_dtdf(1); | | |
|     bs_invf(0); | | |
|     bs_invf(1); | | |
|     sbr_envelope(0,1, bs_amp_res); | | |
|     sbr_envelope(1,1, bs_amp_res); | | |
|     sbr_noise(0.1); | | |
|     sbr_noise(1,1); | | |
|   } | | |
|   if (bs_add_harmonic_flag[0]) | 1 | |
|     sbr_sinusoidal_coding(0); | | |
|   if (bs_add_harmonic_flag[1]) | 1 | |
|     sbr_sinusoidal_coding(1); | | |
|   if (bs_extended_data) { | 1 | |
|     cnt = bs_extention_size; | 4 | uimsbf |
|     if (cnt ==15) | | |
|       cnt += bs_esc_count; | 8 | uimsbf |
|     num_bits_left = 8*cnt; | | |
|     while (num_bits_left >7) { | | |
|       bs_extension_id; | 2 | uimsbf |
|       num_bits_left -=2; | | |
|       sbr_extension(bs_extension_id, num_bits_left); | | Note1 |
|     } | | |
|     bs_fill_bits; | num_bits_left | |
|   } | | |
| } | | |
| Note 1: sbr_extension() shall decrease the variable num_bits_left by the number of bits read from the bitstream payload within sbr_extension(). The sbr_extension() element is reserved for future use. | | |

FIGURE 6B

```
er_raw_data_block()
{
    single_channel_element();
    cnt = bits_to_decode() / 8;
    while (cnt >= 1){
        cnt -= extension_payload(cnt);
    }
    byte_alignment();
}
single_channel_element {
    element_instance_tag[4]=0x0;
    individual_channel_stream(0,0);
} individual_channel_stream(common_window, scale_flag)
{
    global_gain[8]=0x0;
    ics_info();
    section_data() = 0;
    scale_factor_data();
    pulse_data_present[1]=0x0;
    tns_data_present[1]=0x0;
    gain_control_data_present[1]=0x0;
    length_of_recodered_spectral_data[14]=0x0;
    length_of_longest_codeword[6]=0x0;
}
ics_info()
{
    ics_reserved_bit[1]=0x0;
    window_sequence[2]=0x0;
    window_shape[1]=0x0;
    max_sbf[6]=0x0;

predictor_data_present[1]=0x0;
}
scale_factor_data() {
    sf_concealment[1]=0x0;
    rev_global_gain[8]=0x0;
    length_of_rvlc_sf[9]=0x0;
    sf_escape_present[1]=0x0;
}
{extension_payload(cnt)}
extension_type[4] = 0x0;
other_bits[10*8]={0x46,0x52,0x41,0x4D,0x45,0x5F,0x4C,0x4F,0x53,0x53};
other_bits [(cnt-11)*8]={(cnt-11)*0xa5};
other_bits [4]={0x0};
}
```

71 braces the er_raw_data_block through scale_factor_data section.
72 → max_sbf[6]=0x0;
70 braces the extension_payload section.

FIGURE 7

```
Pattern[80] = {
0x00, 0x00, 0x00, 0x00, 0x00, 0x00, 0x00, 0x00, 0x02, 0x32,
0x92, 0x0A, 0x6A, 0x2A, 0xFA, 0x62, 0xx7A, 0x9A, 0x9D, 0x2D,
0x2D, 0x2D, 0x2D, 0x2D, 0x2D, 0x2D, 0x2D, 0x2D, 0x2D, 0x2D,
0x2D, 0x2D, 0x2D, 0x2D, 0x2D, 0x2D, 0x2D, 0x2D, 0x2D, 0x2D,
0x2D, 0x2D, 0x2D, 0x2D, 0x2D, 0x2D, 0x2D, 0x2D, 0x2D, 0x2D,
0x2D, 0x2D, 0x2D, 0x2D, 0x2D, 0x2D, 0x2D, 0x2D, 0x2D, 0x2D,
0x2D, 0x2D, 0x2D, 0x2D, 0x2D, 0x2D, 0x2D, 0x2D, 0x2D, 0x2D,
0x2D, 0x2D, 0x2D, 0x2D, 0x2D, 0x2D, 0x2D, 0x2D, 0x28, 0x00
};
``` structure of replacement frame for New Generation DECT for 48 kHz sampling rate, mono, bit rate 64 kbit/s

FIGURE 8

APPARATUS AND METHOD FOR TRANSMITTING A SEQUENCE OF DATA PACKETS AND DECODER AND APPARATUS FOR DECODING A SEQUENCE OF DATA PACKETS

CROSS-REFERENCE TO RELATED APPLICATIONS

This application is a U.S. national entry of PCT Patent Application Ser. No. PCT/EP2008/001420 filed 22 Feb. 2008, and claims priority to German Patent Application No. 102007013315.6 filed 20 Mar. 2007, German Patent Application No. 102007018484.2 filed 19 Apr. 2007, and U.S. Patent Application No. 60/912,839 filed 19 Apr. 2007, all of which are incorporated herein by references in their entirety.

BACKGROUND OF THE INVENTION

The present disclosure refers to data communication applications and, in particular, to real-time communication of audio signals via packet-oriented networks.

In real-time communication via packet-oriented networks, like, for example, voice over IP (VoIP), normally it cannot be ensured that all packets will arrive at the receiver in the time needed. The reason for this is that, when data are transmitted in a packet-oriented manner, like, for example, via the Internet, different packets take different paths via the data network, and the paths taken via the data network which the different packets may take from the transmitter of the packets to the receiver of the packets depend on the current network situation.

Even if packets are sent in the order in which they were generated, the order of arrival at the receiver will differ with high probability. A packet which has found a favorable path may even "overtake" a packet which was sent at an earlier time but has taken a longer path from the transmitter to the receiver.

For applications which do not need real-time operation or for real-time applications where relatively great delays are allowed, this is not a problem since a receiver buffer will simply buffer until all the packets of a sequence of packets have arrived. Where a packet is positioned in a sequence may exemplarily be determined by a packet number or by a packet sequence indication at the packet and the receiver will then sort the packets in the correct order before reproducing them or passing them on.

However, the smaller this buffer is selected to be or the smaller the allowable delay a packet may have when being transmitted from the transmitter to the receiver is, the greater the packet failure rates will be. Packet losses will not only result when a packet has really been lost, but packet losses will also result when a packet has needed too long a time to get from the transmitter to the receiver. Another problematic situation is when a packet has experienced data corruption on its way from the transmitter to the receiver, i.e. really is faulty.

Such delay-critical applications are present in internet telephony (Voice over IP) where the delay requirements packets from the transmitter to the receiver have to meet are relatively strict in order for the call not to be interrupted. In particular when an audio encoder is arranged on the transmitter side and a decoder is arranged on the receiver and when there are no more data packets to be encoded at the receiver, the result may be a call interruption, namely when the decoder on the receiver side "crashes" due to the lack of data present.

SUMMARY

According to an embodiment, an apparatus for transmitting a sequence of data packets representing an audio signal to a basic decoder or to an extension decoder, wherein the extension decoder has an extended functionality as compared to the basic decoder may have a receiver for receiving packets of the sequence, a packet syntax being specified for the packets; a detector for detecting whether a packet of the sequence of packets is missing or faulty; a provider for providing a replacement packet to replace the faulty packet or the missing packet, the replacement packet being a valid packet with regard to the packet syntax, audio contents of the replacement packet being predetermined audio contents reproducible by the basic decoder and having a predetermined contents characteristic and the replacement packet having an indication for the fact that it is a replacement packet, wherein the indication is implemented such that the indication is ignorable or interpretable by the basic decoder such that the replacement packet is decoded like a valid packet according to the predetermined contents characteristic, and that the indication is interpretable by the extension decoder to perform an error concealing measure which is generating contents for the replacement packet having a contents characteristic differing from the predetermined contents characteristic; and an outputter for outputting the sequence of packets, the sequence of packets having at least one received packet and at least one replacement packet.

According to another embodiment, a method for transmitting a sequence of data packets representing an audio signal to a basic decoder or to an extension decoder, wherein the extension decoder has an extended functionality as compared to the basic decoder may have the steps of receiving packets of the sequence, a packet syntax being specified for the packets; detecting whether a packet of the sequence of packets is missing or faulty; providing a replacement packet to replace the faulty packet or missing packet, the replacement packet being a valid packet with regard to the packet syntax, audio contents of the replacement packet being predetermined audio contents reproducible by the basic decoder and having a predetermined contents characteristic and the replacement packet having an indication for the fact that it is a replacement packet, wherein the indication is implemented such that the indication is ignorable or interpretable by the basic decoder such that the replacement packet is decoded like a valid packet according to the predetermined contents characteristics, and that the indication is interpretable by the extension decoder to perform an error concealing measure which is generating contents for the replacement packet having a contents characteristic differing from the predetermined contents characteristic; and outputting the sequence of packets, the sequence of packets having at least one received packet and at least one replacement packet.

According to another embodiment, an extension decoder for decoding a sequence of packets, wherein the extension decoder has an extended functionality as compared to the basic decoder may have a receiver for receiving the sequence of packets for which a packet syntax is specified, the sequence having at least one data packet and at least one replacement packet, the replacement packet being a valid packet with regard to the packet syntax, audio contents of the replacement packet being predetermined audio contents reproducible by the basic decoder and having a predetermined contents characteristic and the replacement packet having an indication for the fact that it is a replacement packet, wherein the indication is such that the replacement packet may be received by the basic decoder and that the replacement packet may be decoded like a valid packet according to the predetermined contents characteristics, and that the extension decoder is implemented to interpret the indication to perform an error concealing measure which is generating contents for the replacement packet having a contents characteristic differing from the predetermined contents characteristic; a detector for detecting whether a packet has the indication and consequently is a replacement packet; an error concealer for synthesizing synthesis audio contents for the replacement packet the characteristic of which differs from the predetermined contents characteristic, using the error concealer; and an audio renderer for rendering the audio contents of a packet when the packet is not a replacement packet, and for rendering the synthesis audio contents when the packet is a replacement packet.

According to another embodiment, a method for decoding a sequence of packets in an extension decoder, wherein the extension decoder has an extended functionality as compared to the basic decoder may have the steps of receiving the sequence of packets for which a packet sequence is specified, the sequence having at least one data packet and at least one replacement packet, the replacement packet being a valid packet with regard to the packet syntax, the audio contents of the replacement packet being predetermined audio contents reproducible by the basic decoder and having a predetermined contents characteristic, and the replacement packet having an indication for the fact that it is a replacement packet, wherein the indication is such that the replacement packet may be received by the basic decoder and that the replacement packet can be decoded like a valid packet according to the predetermined contents characteristics, and that the extension decoder interprets the indication to perform an error concealing measure which is generating contents for the replacement packet having a contents characteristic differing from the predetermined contents characteristic; detecting whether the packet has the indication and consequently is a replacement packet; for the replacement packet, synthesizing synthesis audio contents the contents characteristic of which differs from the predetermined contents characteristic, by means of the error concealing measure; and rendering the audio contents of a packet when the packet is not a replacement packet, and rendering the synthesis audio contents when the packet is a replacement packet.

According to another embodiment, a computer program may have a program code for executing the method for transmitting a sequence of data packets representing an audio signal to a basic decoder or to an extension decoder, wherein the extension decoder has an extended functionality as compared to the basic decoder having receiving packets of the sequence, a packet syntax being specified for the packets; detecting whether a packet of the sequence of packets is missing or faulty; providing a replacement packet to replace the faulty packet or missing packet, the replacement packet being a valid packet with regard to the packet syntax, audio contents of the replacement packet being predetermined audio contents reproducible by the basic decoder and having a predetermined contents characteristic and the replacement packet having an indication for the fact that it is a replacement packet, wherein the indication is implemented such that the indication is ignorable or interpretable by the basic decoder such that the replacement packet is decoded like a valid packet according to the predetermined contents characteristics, and that the indication is interpretable by the extension decoder to perform an error concealing measure which is generating contents for the replacement packet having a contents characteristic differing from the predetermined contents characteristic; and outputting the sequence of packets, the sequence of packets having at least one received packet and at least one replacement packet, when the method runs on a computer.

According to an embodiment, a computer program may have a program code for executing the method for decoding a sequence of packets in an extension decoder, wherein the extension decoder has an extended functionality as compared to the basic decoder, comprising receiving the sequence of packets for which a packet sequence is specified, the sequence having at least one data packet and at least one replacement packet, the replacement packet being a valid packet with regard to the packet syntax, the audio contents of the replacement packet being predetermined audio contents reproducible by the basic decoder and having a predetermined contents characteristic, and the replacement packet having an indication for the fact that it is a replacement packet, wherein the indication is such that the replacement packet may be received by the basic decoder and that the replacement packet can be decoded like a valid packet according to the predetermined contents characteristics, and that the extension decoder interprets the indication to perform an error concealing measure which is generating contents for the replacement packet having a contents characteristic differing from the predetermined contents characteristic; detecting whether the packet has the indication and consequently is a replacement packet; for the replacement packet, synthesizing synthesis audio contents the contents characteristic of which differs from the predetermined contents characteristic, by means of the error concealing measure; and rendering the audio contents of a packet when the packet is not a replacement packet, and rendering the synthesis audio contents when the packet is a replacement packet, when the method runs on a computer.

In order to avoid crashing on the decoder side and/or avoid artifacts audible for a user on the decoder side, according to the invention, a detection whether a packet of the sequence of packets is missing or faulty is performed. If such a packet loss or packet error has been determined, a replacement packet will be provided, the replacement packet being a valid packet with regard to the packet syntax, wherein, however, audio contents of the replacement packet have a certain contents characteristic. The apparatus for transmitting the sequence of data packets according to the invention outputs an undisturbed sequence of packets, wherein, however, faulty packets or packets not received have been replaced by replacement packets so that the sequence output by the apparatus for transmitting comprises at least one packet received and one replacement packet. In one implementation, the contents and/or the contents characteristic of a packet or frame in a replacement packet is independent of the audio signal, i.e. does not depend on the preceding or subsequent packet or frame. However, if the packet is subjected to an error concealment measure, the synthesis audio contents will depend on the preceding or subsequent frame, i.e. will not be predetermined or signal-independent.

Additionally, the replacement packet gives, in a payload region, an indication for the fact that it is a replacement packet, wherein the indication is ignorable or interpretable by a basic decoder such that the replacement packet will be decoded like a valid packet according to the predetermined contents characteristic, and wherein the indication is interpretable by an extension decoder which, compared to the basic decoder, has an extended functionality to perform an error concealment measure which is generating contents for the replacement packet which has a contents characteristic differing from the predetermined contents characteristic. The replacement packet may be a pure payload packet or may be a packet comprising a payload portion and a header portion, the indication being present not in the header portion, but in the payload portion.

A receiver of the sequence of data packets receives an undisturbed stream of data packets all having a valid data syntax. This receiver will be able to decode the sequence of data packets easily. The receiver, when being a basic receiver, will thus easily decode a replacement packet and reproduce the predetermined audio contents. However, this will result in a loss in quality since the audio contents are predetermined, and thus will not fit the preceding packet or frame and the subsequent packet or frame perfectly. However, such a short temporary loss in quality is unproblematic compared to a situation where the decoder crashes completely due to a packet not being present and thus the entire communication connection be interrupted.

An extension decoder in contrast is able to recognize, using an indication in the replacement packet pointing out that the packet is a replacement packet and not a normal packet, this fact and not simply process the replacement packet, but initiate an error concealment measure when a replacement packet has been received.

Error concealment measures exemplarily include, apart from frame/packet repetitions, extrapolations of previous packets or subsequent packets already present in a memory or interpolations between previous and subsequent packets. Extrapolations or interpolations of this kind in particular include band-wise energy measurements to then synthesize, in an error concealment case, a short-time spectrum of an audio signal the spectrum values of which have been generated in a more or less random manner, wherein, however, the band-wise energy of the randomly generated audio signal depends on the energies of the previous and/or subsequent correctly received packets or packets already generated by error concealment measures.

In one embodiment, the predetermined contents characteristic the replacement packet has is a zero spectrum. The result here is that a basic decoder which decodes the predetermined replacement packet performs "muting". Alternatively, the contents characteristic may be an audio signal the audio contents and/or the spectral values of which correlate with the absolute listening threshold and exemplarily are defined in a way that the audio contents are smaller than two times the absolute listening threshold so that a certain, but small amount of noise is contained across all the bands, which under certain circumstances may, subjectively, sound better than simply "muting".

BRIEF DESCRIPTION OF THE DRAWINGS

Embodiments of the present invention will be detailed subsequently referring to the drawings, in which:

FIG. 6A shows a syntax of extension_payload according to ISO/IEC 14496-3:2005(E) MPEG4;

FIG. 6B shows a table for illustrating the values for the extension_type field;

FIG. 7 shows an exemplary packet syntax for a transform-based audio encoder/decoder;

FIG. 8 shows an example of a replacement packet comprising a valid packet syntax and a predetermined contents characteristic.

DETAILED DESCRIPTION OF THE INVENTION

Figure 1:
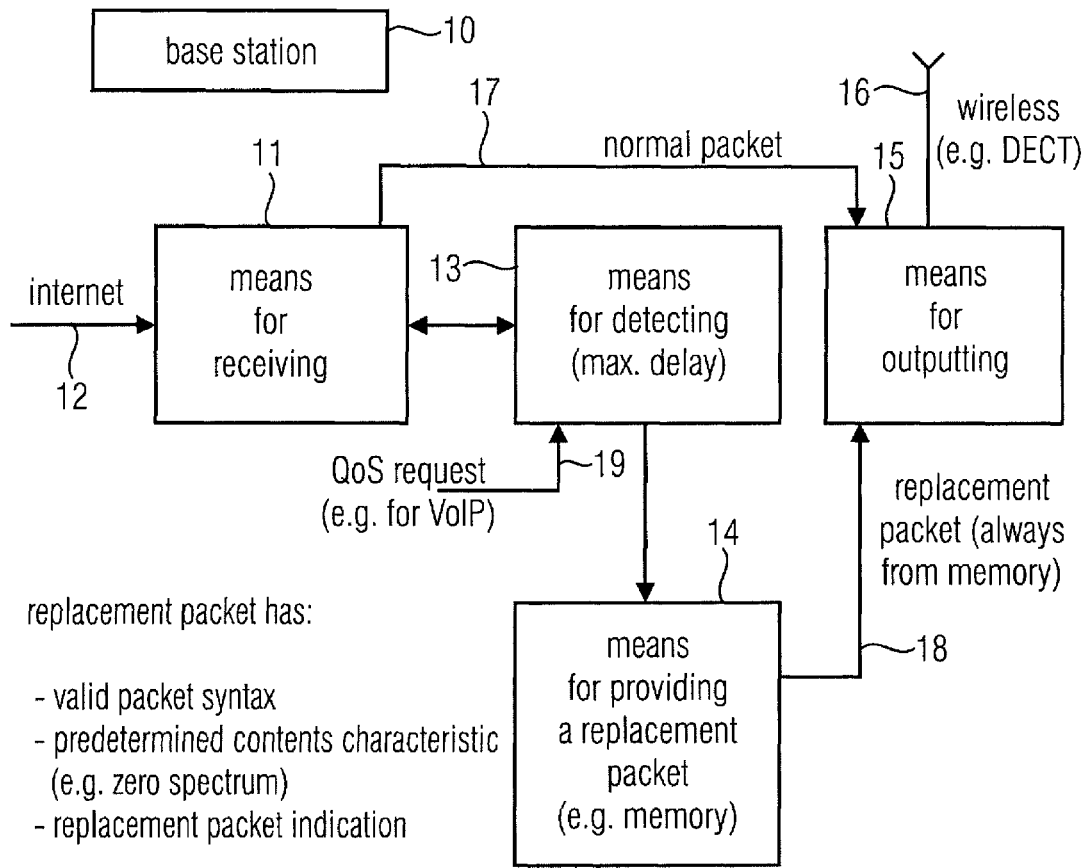
FIG. 1 shows a block circuit diagram of an implementation of the apparatus for transmitting a sequence of data packets.

FIG. 1 shows an apparatus for transmitting a sequence of data packets which represent an audio signal. The apparatus for transmitting, which in FIG. 1 is exemplarily implemented as a base station 10, includes means 11 for receiving packets of the sequence, a packet syntax being specified for the packets. The means 11 for receiving is exemplarily connected to a packet-oriented transmission network, like, for example, the Internet 12. Additionally, the base station 10 includes means 13 for detecting whether a packet of the sequence of packets is missing or faulty. Furthermore, means 14 for providing a replacement packet is provided in order to replace the faulty packet or missing packet. The replacement packet is a valid packet with regard to the packet syntax, however the audio contents of the replacement packet have a predetermined contents characteristic. In addition, the base station includes means 15 for outputting the sequence of packets, the sequence of packets comprising at least one received packet and one replacement packet. Using the example of a base station, the means 15 for outputting is an HF front end which is coupled to an antenna 16 for transmitting in accordance with a predetermined specification, like, for example, the NG DECT specification, a sequence of data packets to a mobile unit which will be discussed in greater detail below referring to FIG. 2.

The means 11 of FIG. 1 is coupled to the means 15 for outputting via a packet line 17 to transmit a normal, i.e. not faulty, packet received on time to the means 15. In addition, the means 14 for providing a replacement packet is connected to the means 15 for outputting via a replacement packet line 18. The means 14 for providing a replacement packet includes a memory where a replacement packet is stored. Whenever a missing or faulty packet has been recognized, the means 14 enables memory access to recover the replacement packet from the memory and feed same via the line 18 to the means 15 for outputting.

In one embodiment, the means 13 for detecting is controlled so as to detect packet loss and enable the means for providing a replacement packet when no packet in a sequence of packets has been received for a longer time than a maximum delay. In one embodiment, this maximum delay is exemplarily controllable via a control line 19. The means 13 for detecting may be fed, via the control line 19, a QoS (quality of service) request which in a VoIP application exemplarily includes a maximum delay. For other packet-oriented applications, except for VoIP, there may be different QoS requests which are fed to the means 13 for detecting via the control line 19. Alternatively, the means 13 for detecting may also have a fixedly set criterion in dependence on which a packet error or packet loss is detected and the means 14 for providing the replacement packet is enabled.

In one embodiment, the replacement packet which is provided via the replacement packet line 18 to the means 15 for outputting does not only have a predetermined contents characteristic, but also an indication for the fact that the packet is a replacement packet. In one embodiment, the indication is such that a basic decoder receiving the replacement packet ignores the indication and decodes the packet like a valid packet according to the predetermined contents characteristic and such that an extension decoder which, compared to the basic decoder, has an extended functionality, interprets the indication to perform an error concealment measure which is generating contents for the replacement packet differing from the predetermined contents characteristic.

Figure 2:
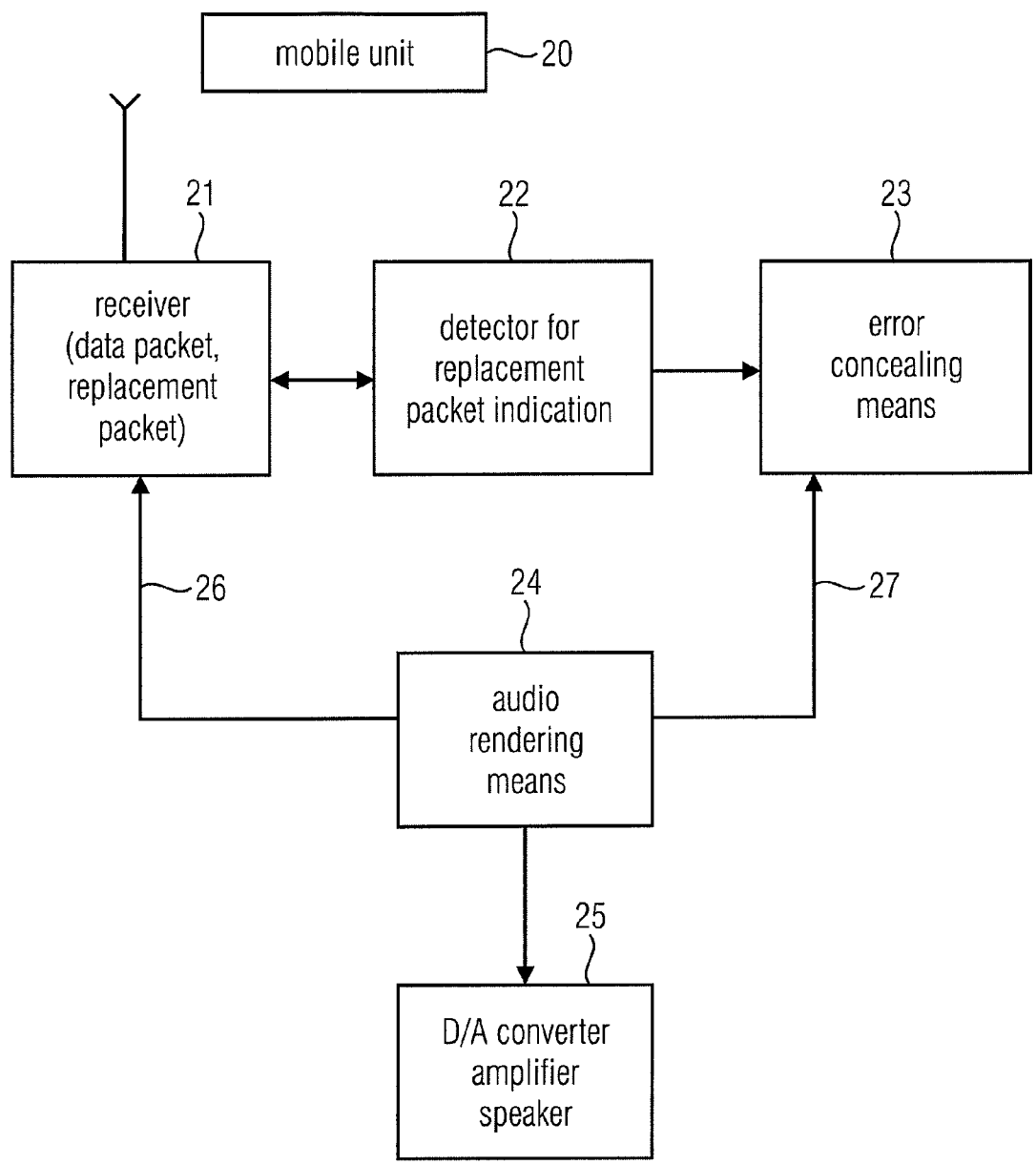
FIG. 2 is a block circuit diagram of a decoder for decoding a sequence of data packets.

FIG. 2 shows a decoder for decoding a sequence of packets which may exemplarily be located in a mobile unit 20. The decoder includes a receiver 21 for receiving the sequence of packets for which a packet syntax is specified, the sequence comprising at least one data packet and at least one replacement packet, the replacement packet being a valid packet with regard to the packet syntax, and audio contents of the replacement packet comprising a predetermined contents characteristic. Additionally, the replacement packet includes an indication for the fact that it is a replacement packet. However, this indication can only be interpreted by the extension decoder illustrated in FIG. 2, whereas this indication cannot be interpreted by a basic decoder.

The interpretation of the indication for a replacement packet is done by a detector 22 which is implemented to detect whether a packet contains the indication and thus is a replacement packet. The extension decoder in FIG. 2 further includes error concealing means 23 for synthesizing synthesis audio contents comprising a contents characteristic differing from the predetermined contents characteristic contained in the replacement packet. In addition, the extension decoder includes audio rendering means 24 for rendering the audio contents of a packet when the packet is not a replacement packet and for rendering the synthesis audio contents when the packet is a replacement packet. The audio rendering means 24 is coupled to an output unit 25 which may exemplarily include a D/A converter, an amplifier and a speaker.

In particular, the audio rendering means is coupled to the receiver 21 via a packet line 26 via which a regular packet is transmitted. In addition, the audio rendering means 24 is connected to the error concealing means 23 via a replacement packet line 27 via which synthesis audio contents are transmitted from the error concealing means 23 to the audio rendering means 24.

The error concealing means 23 may perform error concealing in different manners. Simple error concealing means is simply repeating the previous frame and/or audio contents of the previous packet or the audio contents of the subsequent packet. This error concealing measure is referred to as "frame repetition". Alternatively, the error concealing means may be implemented to perform extrapolation or interpolation. The extrapolation or interpolation may be performed relative to spectral values or bands. In the case of a spectral value extrapolation, a spectral value for a replacement frame may be formed on the basis of one or several spectral values having equal frequencies of previous frames. Alternatively, error concealing may also be performed with regard to bands in that the spectral values in one band are exemplarily generated by a buffer as a random number generator or generated in a more or less determined way and that the spectral values are then weighted such that the energy they represent equals a target energy, this target energy having been derived from one or several previous frames and/or one or several subsequent frames. The previous and/or subsequent frames may be valid received packets or may be packet and/or frames having already been generated by error concealing means when packet loss has occurred where not only a single packet was lost, but several successive packets were lost.

In an embodiment of the present invention, the audio encoder generating the sequence of packets is a transform-based audio encoder. Such a transform-based audio encoder comprises a time-frequency converting stage 30 by means of which a temporal audio signal is converted to a sequence of short-time spectra. Every short-time spectrum is fed to a quantizer 31 performing quantization which is controlled by a psycho-acoustic model 32 such that quantization is executed such that quantizing noise does not disturb the subjective audio impression. Downstream of the quantizer is an entropy encoder 33 which may exemplarily be a Huffman encoder. The entropy encoder provides a sequence of bits which in connection with side information which are exemplarily provided by the quantizer 31 in the form of scaling factors and exemplarily provided by the entropy encoder 33 in the form of the encoding table used, form data provided to a packet packer 34 outputting the sequence of data packets on the output side. Apart from the packet packer 34, the audio encoder shown in FIG. 2 represents a typical transform-based encoder, as is exemplarily known under the keyword MP3 (MPEG-1 Layer 3) or AAC (MPEG-4) or AC-3 etc. It is to be pointed out that the packet packer 34, depending on requirements, is implemented to generate one packet per audio frame, i.e. per short-time spectrum, or generate more than one audio frame, i.e. bring several encoded short-time spectra into a single packet.

Figure 4:
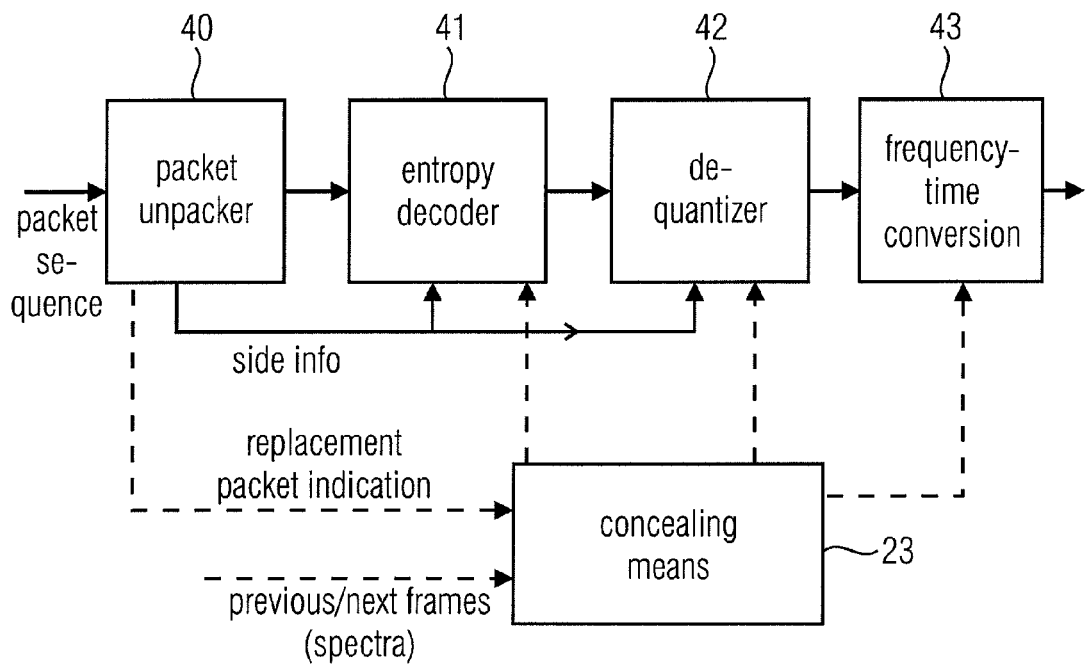
FIG. 4 shows, among other things, a more special implementation of the audio rendering means of FIG. 2.

FIG. 4 shows a more detailed representation of the audio rendering means 24 of FIG. 2 and, in particular, the cooperation of the audio rendering means 24 and the error concealing means 23. On the input side, the audio rendering means includes a packet unpacker 40 which unpacks a packet so as to separate the side information from the "main information".

The main information, i.e. the short-time spectra represented by a sequence of bits, are fed to an entropy decoder 41 which provides quantizing indices which are fed to a de-quantizer 42 providing at its output quantized and again de-quantized spectral values which are then used, after a frequency-time conversion in block 43, to generate the output audio signal. Both the entropy decoder 41 and the de-quantizer 42 may be controlled by the side information, the entropy decoder typically receiving a code table index, whereas the de-quantizer 42 receives scaling factors for performing correct de-quantization.

Figure 3:
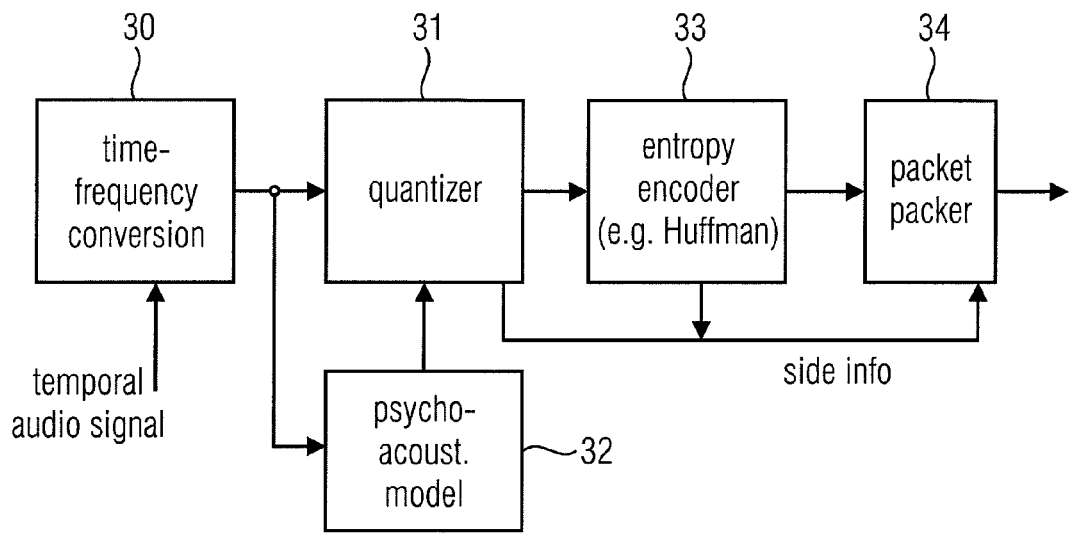
FIG. 3 is a block circuit diagram of an audio encoder for generating a sequence of data packets.

The packet unpacker 40 will then be able, when comprising a detection characteristic as is present in the detector 22 of FIG. 2, to send the concealing means 22 a replacement packet indication such that the concealing means 23 can recognize that the current packet is not a packet generated by the encoder of FIG. 3, but a replacement packet generated by the base station. In this case, the concealing means will with provide the entropy decoder either a sequence of bits or provide the de-quantizer with a sequence of quantizing indices or will provide the frequency-time converting means with a sequence of spectral values to feed the synthesis audio contents to the decoder functional chain at any location. Synthesized spectral audio contents are fed at the end of the chain, i.e. at the frequency-time converting stage 43.

These spectral contents depend on the previous spectra already received correctly or on the next spectra which may already be present and may include error concealing means relating to spectral values, bands or both, i.e. relating to both spectral values and bands, to synthesize the audio contents.

As has already been illustrated using FIGS. 1 and 2, an implementation of the invention is utilized in a base station and a mobile unit, wherein it is assumed that the base station can receive packets in an incorrect order, like, for example, when the base station is coupled to the Internet, whereas the mobile unit is dependent on receiving a sequence of packets in the correct order. Such a communication connection between a base station and a mobile unit is, for example, defined by the DECT standard.

In real-time communication via packet-oriented networks (e.g. VoIP), it cannot be ensured that all the packets will reach the receiver in the time needed. After a certain (very limited) time, packets that have not yet arrived have to be classified as lost. In the case of IP packet loss, a replacement audio frame is generated and transmitted by the base station.

Such a replacement will be performed by the base station of a next generation (NG) DECT system. Instead of the original (but not received) frames, the replaced frames are transmitted from the base station to the mobile unit. The NG DECT specification represents an extension of the present DECT specification by, among other things, wide-band and super-wide-band audio codecs and an IP terminal.

An NG DECT station includes one or several wireless telephones receiving calls from an NG DECT base station. Consequently, it becomes possible to make VoIP calls directly via NG DECT phones. In the ideal case, the VoIP voice packets can be transmitted, without being encoded again in the base station, from the base station to the mobile unit.

When, for example, audio codecs are used which in their regular syntax offer no special way of signalizing a frame loss, replacement packets are generated. Such a replacement audio frame should be decodable by a decoder conforming to standards, but, in one embodiment, should at the same time offer an extended decoder a way of recognizing unambiguously that this frame is a replacement frame so that this extended decoder can enable corresponding countermeasures, like, for example, error concealing. Introducing a replacement frame should additionally be done without greater calculating complexity and, in particular, without special evaluation of previous audio data by a base station such that a base station can operate as a pure relay station, i.e. a station providing data transmission without decoding and encoding again. Thus, a base station should, if at all, perform only very little packet unpacking which may exemplarily only be performed so as to recover packet sequence information indicating where a data packet is arranged in the sequence, so that correct decoding of the audio contents represented by the sequence of data packets may take place.

In one embodiment, special user-specified data regions are used by transform-based encoders to provide signalization for a decoder including extended functionality, i.e. an extension decoder, indicating that the respective frame is a replacement frame, even though the underlying bitstream syntax standard has not provided for such signalization.

When a frame or packet carries a header and a payload portion, the payload portion containing the useful data, it may accommodate the indication in the payload data, since, in subsequent audio processing when the header is not considered anyway, the indication would drop out and thus error concealing would no longer be possible.

When a packet only has a payload portion and no header, only accommodating the indication in the payload portion allows implementing the embodiment. The indication is accommodated in the audio data and/or audio data portion.

In one implementation, the replacement audio frame and/or replacement packet meets, in the case that no explicit way of signalizing a frame loss is provided, a first criterion which is that the replacement frame and/or replacement packet be decodable by a decoder conforming to standards. The second criterion is that the replacement frame should offer an extended decoder a way of recognizing unambiguously that this frame is a replacement frame so that this extended decoder can enable error concealing.

A conventional decoder conforming to standards will be able to decode the replacement frame if the replacement frame is a valid frame according to the predetermined standardized data stream syntax and/or packet syntax or frame syntax. In one implementation, it may replace the missing frame by a frame without audio contents, i.e. to perform so-called muting. Muting means that the entire spectrum is set to zero. In particular, using the AAC standard (MPEG-4-Audio), that variation is advantageous for generating the zero spectrum where the highest scaling factor band for which spectral values are transmitted is set to zero (max_sfb=0). Alternatively, spectral values for scaling factor bands which again are zero may also be transmitted. This may in principle be realized using any available Huffman code book of the different code books provided, wherein, when using the code book "ZERO_HCB" (Zero Huffman Code Table), these spectral lines do not explicitly have to be transmitted.

It is pointed out that the base station which is to detect the faulty or missing frame may already perform error concealing measures. However, according to the invention it is advantageous for the base station not to perform such an error concealing measure since the error concealing measure is complex with regard to calculation and additionally requests evaluating the previous and, maybe, future audio signals. In particular when a DECT base station "serves" several mobile units, the result of this would be that a base station, in order to be able to perform complete error concealing, decodes and encodes again all the audio contents continuously. Apart from the pertaining requirement for high processor and memory resources, in particular when using a lossy encoder, the result would be the danger of additional quality deterioration due to tandem encoding effects. Additionally, delay would increase strongly.

Since, in the AAC standard, no explicit way of signaling a frame loss is provided, in one implementation a way of signalization which is ignored by a regular decoder is used. The data syntax and/or packet syntax is kept here. On the other hand, simply setting the spectrum of a frame to zero is not sufficient for providing a safe indication for the fact that this is a replacement frame and/or replacement packet, since frames of this kind may also be present in regular operation when, for example, there is no signal at the encoder input.

The indication for the fact that a frame is a replacement frame and/or a replacement packet provides an extension decoder with the information that the present frame is not a frame where the spectrum is really zero, but that the present frame is a frame having been introduced into a base station due to transmission errors to avoid failure of the decoder and/or failure of the voice link.

Audio encoding standards typically provide user-specific data regions allowing additional payload transmission, wherein this payload, however, is ignored by conventional decoders, i.e. basic decoders with no extended functionality. In the AAC standard, such a user-defined payload is the so-called "extension_payload", as is defined in FIG. 6A. Depending on the value of the "extension_type" variable, as is shown in FIG. 6B, a different purpose is provided for in the standard. FIGS. 6A and 6B are extracts from the standard ISO/IEC14496-3:2005(E). The usage of the fill element (FILL) described there is provided in the standard for the following purpose. Fill elements have to be added to the bitstream when the overall number of bits for all the audio data together with all the additional data is smaller than the minimum number of bits in this frame allowed to achieve the target bit rate. Dynamic range control bits (DRC bits) are added when the encoder wants to introduce such DRC information. Under normal conditions, fill bits are, as the standard says, avoided and the free bits are used to fill up the bit reservoir and/or bit savings bank. Only if the bit reservoir is full will fill bits be written. Any number of fill elements is allowed.

In one implementation of the invention, as is shown in FIG. 7 at 70, the "extension_type" is set to "0000" to write—in contrast to the standard usage of fill bits—the indication for a frame loss in the "other_bits" field.

The user-specific data region provided in the standard for fill bits is used to provide a signalization of the replacement frame, i.e. to accommodate the indication for a replacement frame. Depending on the implementation, however, other "extension_payload ( )" may be used, depending on a different setting of the "extension_type" value. Since a zero spectrum is transmitted efficiently (by setting max_sfb to zero) or a Zero Huffman code book is used, there are sufficient bits available for various extension_payloads ( ).

It is to be pointed out that a typical MPEG-4-conforming data stream and/or packet syntax and/or frame syntax for a replacement packet is shown at 71, wherein, as is illustrated at 72, the variation "max_sfb=0" is used. All the other data needed for obtaining a valid packet syntax are also set to zero. However, it is to be pointed out that the data themselves are no reliable indication for a replacement frame. Only the extension_payload 70 will result in a reliable indication since a normal encoder would not write such a frame with a zero spectrum, but a special extension_payload.

FIG. 8 shows an exemplary replacement frame for new generation DECT for a sampling rate of 48 kHz, a mono signal and a bit rate of 64 kBit/s. It is pointed out that the extension_payload, as is shown in FIG. 7 at 70, is not to be seen easily in FIG. 8 since the extension_payload is not "byte-aligned" in the bitstream.

Also, it is pointed out that the bit combination in the "extension_payload" comprises a bit pattern which is also referred to as "error pattern", which corresponds to the ASCII code for "FRAME_LOSS". It is ensured by this that no conflict is caused with other users of extension_payload, since it is highly improbable that another user would use the ASCII code for "FRAME_LOSS" to signal something which has nothing to do with "FRAME_LOSS".

Different orders of packets or frames will be discussed below referring to FIG. 5, as may occur at different points in the transmission scenario from a transmitter of the packet to a decoder and/or to audio rendering means in the decoder.

Figure 5A:
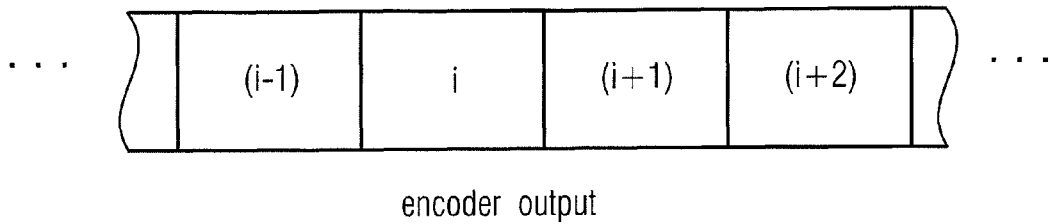
FIG. 5A shows a sequence of data packets as are output by an encoder.

FIG. 5A shows a sequence of packets of the number (i−1), (i+1), (i+2). Such a correct sequence of packets or frames occurs at the input to a packet-oriented transmission network, like, for example, the Internet.

Figure 5B:
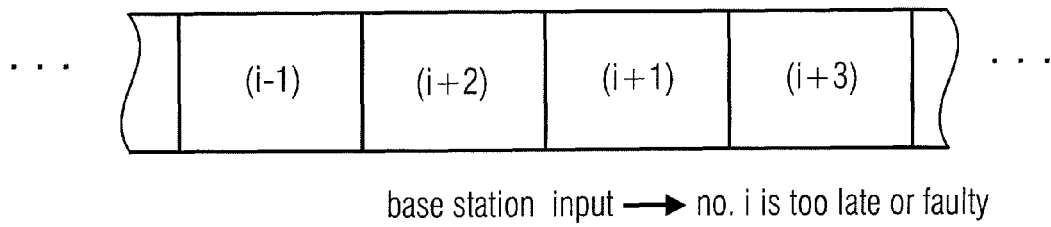
FIG. 5B shows a sequence of data packets as are received by a base station.

FIG. 5B shows a sequence of packets at the input to the base station, wherein it can be seen that the packet i, in the time sector considered by FIG. 5B, has not yet arrived, but that the order has become mixed up. The reason for this is that the packet i has either got lost completely or has obtained a very long path from the transmitter to the receiver. On the other hand, the packet (i+2) has obtained a very favorable path, so that this packet has "overtaken" the packet (i+1) on its way from the transmitter, i.e. the encoder, to the base station input.

Figure 5C:
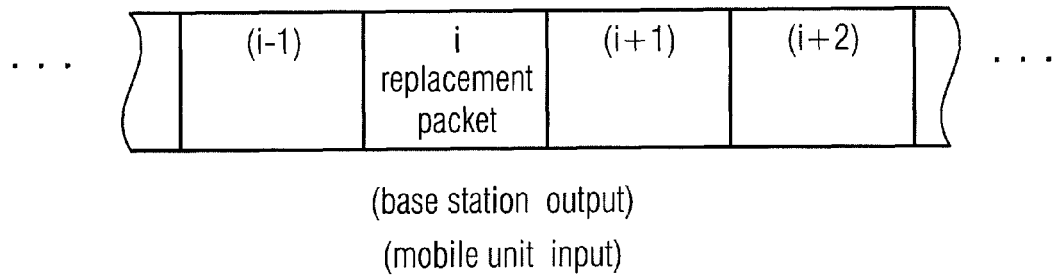
FIG. 5C shows a sequence of data packets as are output by a base station and received by a mobile unit, a replacement packet having been inserted.
Figure 5D:
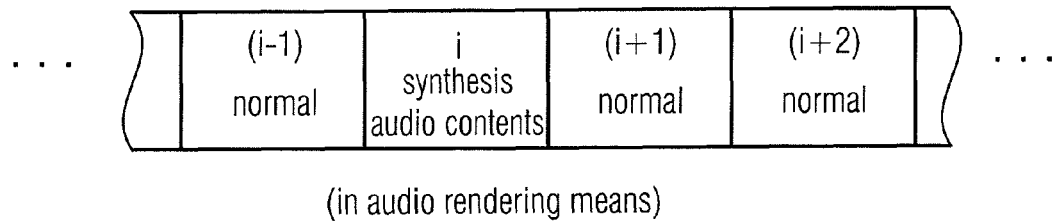
FIG. 5D shows a sequence of audio contents as are generated in audio rendering means.

The means 11 for receiving in FIG. 1 will sort the packets as they have arrived in FIG. 5B again in the correct order. Additionally, the means 13 for decoding will find out that the packet having the number i is not present or is faulty. For this reason, a replacement packet will be generated for number i, as can be seen in FIG. 5C. FIG. 5C thus shows the sequence of packets as is output by the means 15 for outputting in FIG. 1. On the path from the base station according to FIG. 1 to the mobile unit according to FIG. 2, the order of the packets does not change. However, the extension decoder, as is illustrated in FIG. 2, will recognize that the packet of the number i is a replacement packet. In contrast to the other packets shown in FIG. 5D, for which normal rendering of the audio contents takes place, synthesis audio contents going back to an error concealing measure are generated for the replacement packet.

Depending on the circumstances, the inventive method may be implemented in either hardware or software. The implementation may be on a digital storage medium, in particular on a disc or CD having control signals which may be read out electronically which can cooperate with a programmable computer system such that the corresponding method will be executed. Generally, the invention is also in a computer program product comprising a program code stored on a machine-readable carrier for performing the method when the computer program product runs on a computer. In other words, the invention may thus be realized as a computer program having a program code for performing the method when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for transmitting a sequence of data packets representing an audio signal to a basic decoder or to an extension decoder, wherein the extension decoder comprises an extended functionality as compared to the basic decoder, comprising:
 a receiver for receiving packets of the sequence, a packet syntax being specified for the packets;
 a detector for detecting whether a packet of the sequence of packets is missing or faulty;
 a provider for providing a replacement packet to replace the faulty packet or the missing packet, the replacement packet being a valid packet with regard to the packet syntax, audio contents of the replacement packet being predetermined audio contents reproducible by the basic decoder and comprising a predetermined contents characteristic and the replacement packet comprising an indication for the fact that it is a replacement packet, wherein the indication is implemented such that the indication is ignorable or interpretable by the basic decoder such that the replacement packet is decoded like a valid packet according to the predetermined contents characteristic, and that the indication is interpretable by the extension decoder to perform an error concealing measure which is generating contents for the replacement packet comprising a contents characteristic differing from the predetermined contents characteristic; and
 an outputter for outputting the sequence of packets, the sequence of packets comprising at least one received packet and at least one replacement packet.

2. The apparatus of claim 1, wherein a packet of the sequence receivable by the receiver for receiving comes from a transform-based audio encoder and comprises a short-time spectrum of a temporal sector of the audio signal, and
 wherein the predetermined contents characteristic is that all the spectral values equal zero or together represent an energy smaller than two times the energy represented by a psycho-acoustic resting listening threshold.

3. The apparatus of claim 1, wherein the provider for providing comprises:
a memory for storing the replacement packet;
a memory fetcher for fetching the replacement packet from the memory whenever the detector for detecting detects a faulty packet or a missing packet.

4. The apparatus of claim 1, wherein the receiver for receiving is an input interface of a telephone base station and is connectable to a network implemented for packet-based data transmission.

5. The apparatus of claim 1, wherein the replacement packet comprises a payload region where the indication is located.

6. The apparatus of claim 1, wherein the packet syntax is implemented to define an extension payload field, and wherein the indication is formed by data in the extension payload field.

7. The apparatus of claim 6, wherein the data are generated in accordance with a letter code, the data comprising a meaning indicating at a data loss.

8. The apparatus of claim 7, wherein the data represent the expression "FRAME_LOSS" or "data loss".

9. The apparatus of claims 7, wherein the letter code is the ASCII code.

10. The apparatus of claim 1, wherein the sequence of packets is generated by an audio encoder according to MPEG-1, layer 3, or MPEG-4 AAC, a bit reservoir function being disabled.

11. The apparatus of claim 1, which is implemented as a base station.

12. The apparatus of claim 1, wherein the packet syntax comprises a fill data field which is filled by a basic encoder when a minimum number of bytes provided for the frame is not needed for encoding a portion of the audio signal, and
wherein the indication is represented by a predetermined bit combination in the fill data field.

13. The apparatus of claim 1, wherein the detector for detecting is implemented to wait for a predetermined duration for a data packet comprising a sequence position indication and to signalize, when the predetermined duration has passed without detecting the data packet, a packet loss to the provider for providing.

14. The apparatus of claim 13, wherein the sequence position information sought is set by a sequence position indication of a preceding or subsequent valid packet.

15. The apparatus of claims 13, wherein the predetermined duration is settable and predeterminable by a QoS request.

16. The apparatus of claim 15, wherein the predetermined duration is smaller when the QoS request comprises a smaller delay and is greater when the QoS request allows a greater delay.

17. The apparatus of claim 1, wherein the outputter for outputting is implemented to output the sequence of packets as an unbroken sequence of packets and replacement packets representing a complete continuous sequence.

18. The apparatus of claim 1, wherein the receiver for receiving is implemented to receive packets but not, or at most partly, to decode the packets received in order to detect sequence position information in the packet.

19. A method for transmitting a sequence of data packets representing an audio signal to a basic decoder or to an extension decoder, wherein the extension decoder comprises an extended functionality as compared to the basic decoder comprising:
receiving packets of the sequence, a packet syntax being specified for the packets;
detecting whether a packet of the sequence of packets is missing or faulty;
providing a replacement packet to replace the faulty packet or missing packet, the replacement packet being a valid packet with regard to the packet syntax, audio contents of the replacement packet being predetermined audio contents reproducible by the basic decoder and comprising a predetermined contents characteristic and the replacement packet comprising an indication for the fact that it is a replacement packet, wherein the indication is implemented such that the indication is ignorable or interpretable by the basic decoder such that the replacement packet is decoded like a valid packet according to the predetermined contents characteristics, and that the indication is interpretable by the extension decoder to perform an error concealing measure which is generating contents for the replacement packet comprising a contents characteristic differing from the predetermined contents characteristic; and
outputting the sequence of packets, the sequence of packets comprising at least one received packet and at least one replacement packet.

20. An extension decoder for decoding a sequence of packets, wherein the extension decoder comprises an extended functionality as compared to the basic decoder, comprising:
a receiver for receiving the sequence of packets for which a packet syntax is specified, the sequence comprising at least one data packet and at least one replacement packet, the replacement packet being a valid packet with regard to the packet syntax, audio contents of the replacement packet being predetermined audio contents reproducible by the basic decoder and comprising a predetermined contents characteristic and the replacement packet comprising an indication for the fact that it is a replacement packet, wherein the indication is such that the replacement packet may be received by the basic decoder and that the replacement packet may be decoded like a valid packet according to the predetermined contents characteristics, and that the extension decoder is implemented to interpret the indication to perform an error concealing measure which is generating contents for the replacement packet comprising a contents characteristic differing from the predetermined contents characteristic;
a detector for detecting whether a packet comprises the indication and consequently is a replacement packet;
an error concealer for synthesizing synthesis audio contents for the replacement packet the characteristic of which differs from the predetermined contents characteristic, using the error concealer; and
an audio renderer for rendering the audio contents of a packet when the packet is not a replacement packet, and for rendering the synthesis audio contents when the packet is a replacement packet.

21. The extension decoder of claim 20, wherein the predetermined contents characteristic is a zero spectrum, wherein the received packets of the sequence of packets have been generated by a transform-based audio encoder, and
wherein the audio renderer comprises a transform-based audio decoder.

22. The extension decoder of claim 21, wherein the error concealer is implemented to generate synthesis spectral values, and
wherein the audio renderer is implemented to convert the synthesis spectral values to a temporal representation.

23. The extension decoder of claim 20, wherein the error concealer is implemented to generate the synthesis audio contents by extrapolation of audio contents from a previous or subsequent intact or concealed audio packet, or
- to generate the synthesis audio contents by interpolation of audio contents of a previous intact or concealed packet and a subsequent intact or concealed packet.

24. A method for decoding a sequence of packets in an extension decoder, wherein the extension decoder comprises an extended functionality as compared to the basic decoder, comprising:
- receiving the sequence of packets for which a packet sequence is specified, the sequence comprising at least one data packet and at least one replacement packet, the replacement packet being a valid packet with regard to the packet syntax, the audio contents of the replacement packet being predetermined audio contents reproducible by the basic decoder and comprising a predetermined contents characteristic, and the replacement packet comprising an indication for the fact that it is a replacement packet, wherein the indication is such that the replacement packet may be received by the basic decoder and that the replacement packet can be decoded like a valid packet according to the predetermined contents characteristics, and that the extension decoder interprets the indication to perform an error concealing measure which is generating contents for the replacement packet comprising a contents characteristic differing from the predetermined contents characteristic;
- detecting whether the packet comprises the indication and consequently is a replacement packet;
- for the replacement packet, synthesizing synthesis audio contents the contents characteristic of which differs from the predetermined contents characteristic, by means of the error concealing measure; and
- rendering the audio contents of a packet when the packet is not a replacement packet, and rendering the synthesis audio contents when the packet is a replacement packet.

25. A computer program comprising a program code for executing the method for transmitting a sequence of data packets representing an audio signal to a basic decoder or to an extension decoder, wherein the extension decoder comprises an extended functionality as compared to the basic decoder comprising:
- receiving packets of the sequence, a packet syntax being specified for the packets;
- detecting whether a packet of the sequence of packets is missing or faulty;
- providing a replacement packet to replace the faulty packet or missing packet, the replacement packet being a valid packet with regard to the packet syntax, audio contents of the replacement packet being predetermined audio contents reproducible by the basic decoder and comprising a predetermined contents characteristic and the replacement packet comprising an indication for the fact that it is a replacement packet, wherein the indication is implemented such that the indication is ignorable or interpretable by the basic decoder such that the replacement packet is decoded like a valid packet according to the predetermined contents characteristics, and that the indication is interpretable by the extension decoder to perform an error concealing measure which is generating contents for the replacement packet comprising a contents characteristic differing from the predetermined contents characteristic; and
- outputting the sequence of packets, the sequence of packets comprising at least one received packet and at least one replacement packet, when the method runs on a computer.

26. A computer program comprising a program code for executing the method for decoding a sequence of packets in an extension decoder, wherein the extension decoder comprises an extended functionality as compared to the basic decoder, comprising:
- receiving the sequence of packets for which a packet sequence is specified, the sequence comprising at least one data packet and at least one replacement packet, the replacement packet being a valid packet with regard to the packet syntax, the audio contents of the replacement packet being predetermined audio contents reproducible by the basic decoder and comprising a predetermined contents characteristic, and the replacement packet comprising an indication for the fact that it is a replacement packet, wherein the indication is such that the replacement packet may be received by the basic decoder and that the replacement packet can be decoded like a valid packet according to the predetermined contents characteristics, and that the extension decoder interprets the indication to perform an error concealing measure which is generating contents for the replacement packet comprising a contents characteristic differing from the predetermined contents characteristic;
- detecting whether the packet comprises the indication and consequently is a replacement packet;
- for the replacement packet, synthesizing synthesis audio contents the contents characteristic of which differs from the predetermined contents characteristic, by means of the error concealing measure; and
- rendering the audio contents of a packet when the packet is not a replacement packet, and rendering the synthesis audio contents when the packet is a replacement packet, when the method runs on a computer.

* * * * *

UNITED STATES PATENT AND TRADEMARK OFFICE
CERTIFICATE OF CORRECTION

PATENT NO.      : 8,385,366 B2
APPLICATION NO. : 12/530647
DATED           : February 26, 2013
INVENTOR(S)     : Sperschneider et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 694 days.

Signed and Sealed this
First Day of September, 2015

Michelle K. Lee
*Director of the United States Patent and Trademark Office*